United States Patent
Yeu et al.

(10) Patent No.: US 7,872,855 B2
(45) Date of Patent: Jan. 18, 2011

(54) CAPACITOR AND MANUFACTURING METHOD THEREOF

(75) Inventors: Tae Whan Yeu, Seoul (KR); Kyoung Ho Kim, Seoul (KR); Jee Young Yoo, Seoul (KR); Ue Jin Lee, Seoul (KR)

(73) Assignee: Chung-Ang University Industry - Academy Cooperation Foundation, Seoul (KR)

( * ) Notice: Subject to any disclaimer, the term of this patent is extended or adjusted under 35 U.S.C. 154(b) by 292 days.

(21) Appl. No.: 11/921,195

(22) PCT Filed: Sep. 6, 2006

(86) PCT No.: PCT/KR2006/003540

§ 371 (c)(1),
(2), (4) Date: Jan. 7, 2008

(87) PCT Pub. No.: WO2007/029966

PCT Pub. Date: Mar. 15, 2007

(65) Prior Publication Data

US 2009/0128994 A1    May 21, 2009

(30) Foreign Application Priority Data

Sep. 6, 2005  (KR) .................. 10-2005-0082560

(51) Int. Cl.
*H01G 9/00* (2006.01)
*H01G 9/02* (2006.01)
(52) U.S. Cl. .................. 361/502; 29/25.03; 252/62.2

(58) Field of Classification Search .................. 361/502; 252/62.2
See application file for complete search history.

(56) References Cited

U.S. PATENT DOCUMENTS

| | | | | | |
|---|---|---|---|---|---|
| 3,536,963 | A | * | 10/1970 | Boos | 361/502 |
| 3,648,126 | A | * | 3/1972 | Boos et al. | 361/502 |
| 5,117,332 | A | * | 5/1992 | Kudoh et al. | 361/525 |
| 5,471,365 | A | * | 11/1995 | Nakamura et al. | 361/523 |
| 5,754,393 | A | | 5/1998 | Hiratsuka et al. | |
| 6,299,790 | B1 | * | 10/2001 | Kono et al. | 252/62.2 |
| 2002/0034061 | A1 | * | 3/2002 | Noguchi et al. | 361/502 |
| 2002/0061449 | A1 | * | 5/2002 | Maruo et al. | 429/303 |
| 2002/0094655 | A1 | * | 7/2002 | Kasahara et al. | 438/329 |
| 2003/0062257 | A1 | * | 4/2003 | Gozdz | 204/252 |

FOREIGN PATENT DOCUMENTS

| | | | |
|---|---|---|---|
| JP | 3038816 | | 2/1991 |
| JP | 06124853 A | * | 5/1994 |
| JP | 7220985 | | 8/1995 |
| JP | 7249551 | | 9/1995 |
| JP | 9213589 | | 8/1997 |

\* cited by examiner

*Primary Examiner*—Eric Thomas
*Assistant Examiner*—David M Sinclair
(74) *Attorney, Agent, or Firm*—D. Peter Hochberg; Sean F. Mellino; Daniel J. Smola

(57) ABSTRACT

A capacitor having an electrode made from an electroconductive material and activated carbon in combination with quaternary ammonium tosylate, and a method for manufacturing the same. The method enables the preparation of a high capacitance electrode without special facilities. The capacitor exhibits high specific capacitance and a high energy density.

5 Claims, 4 Drawing Sheets

[Fig. 1]
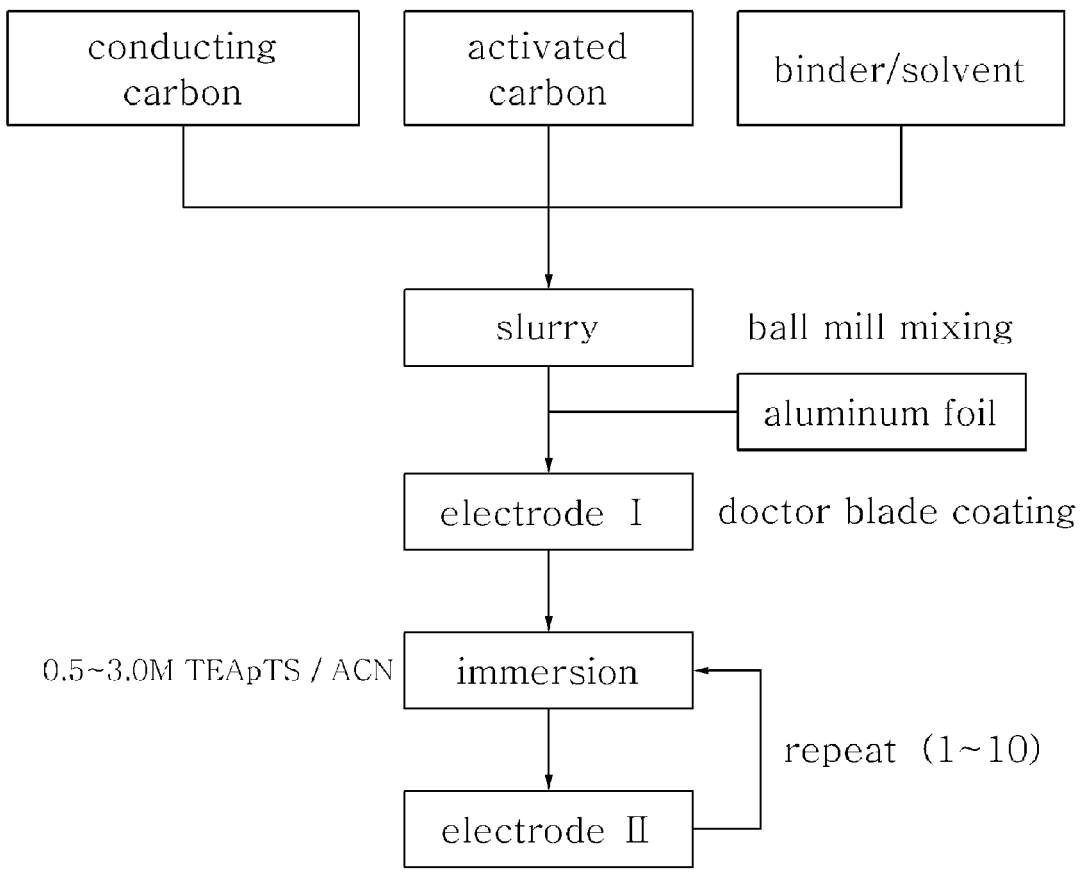
[Fig. 2]
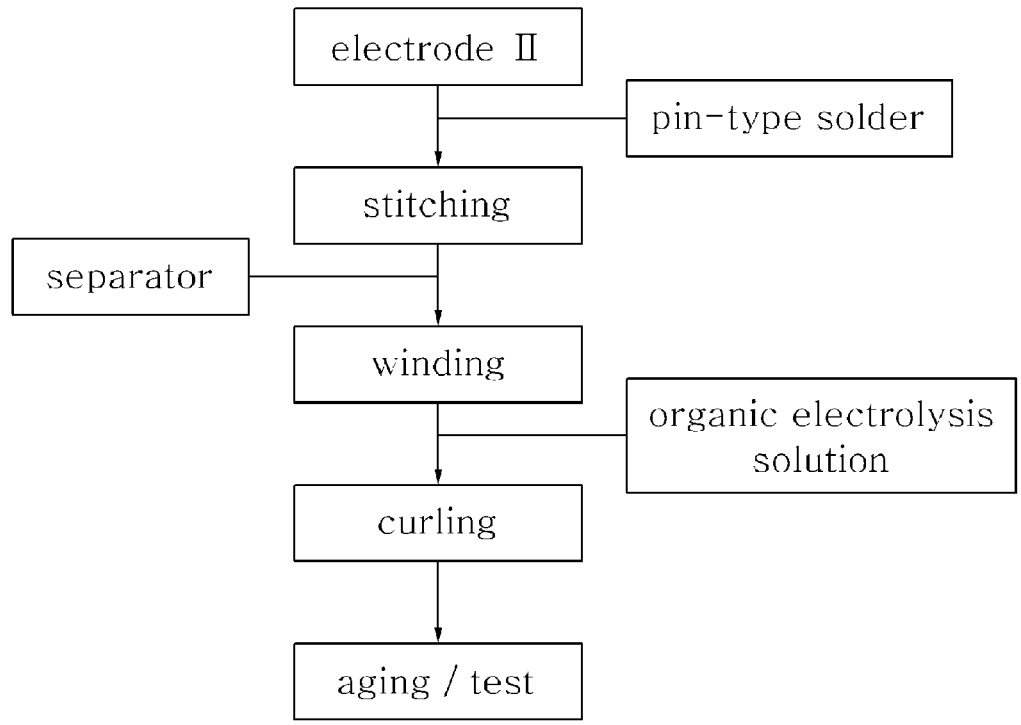

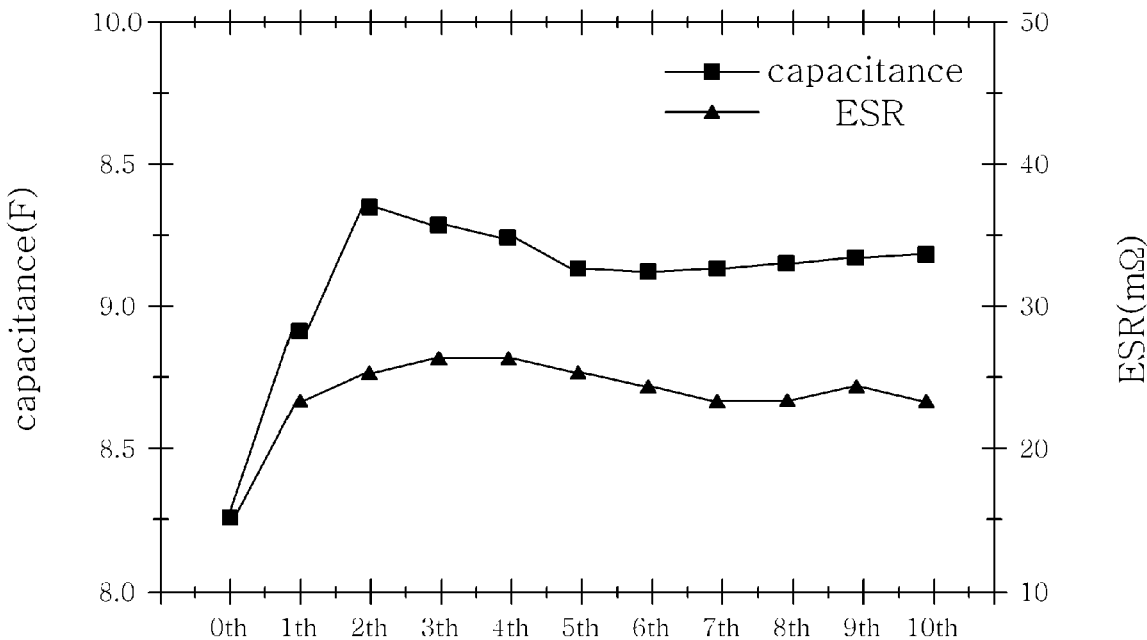
[Fig. 3]
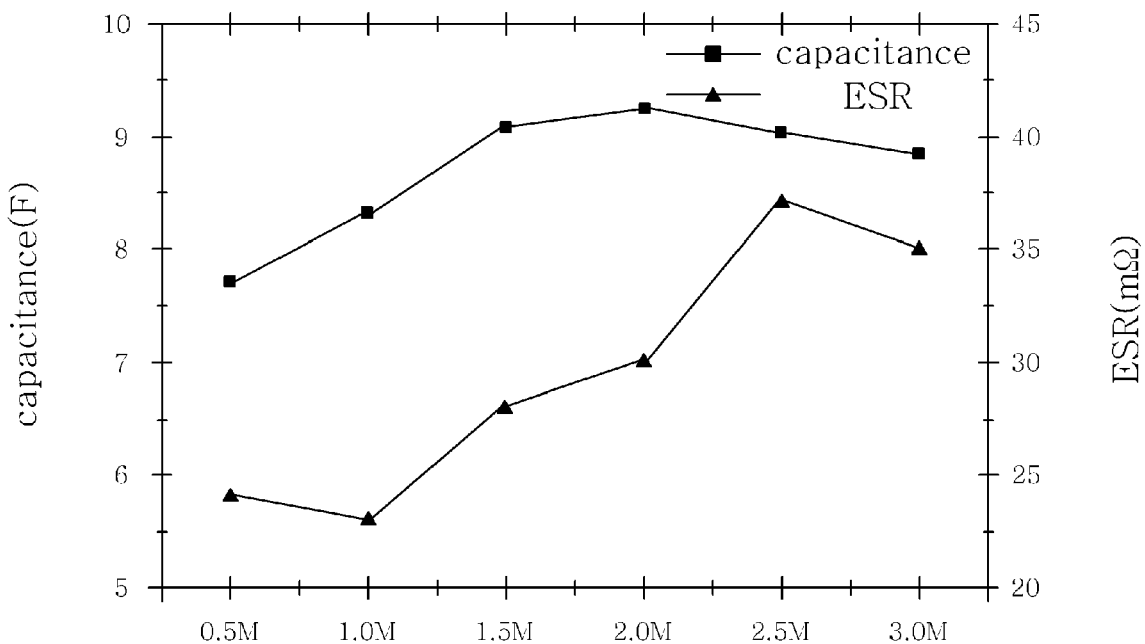
[Fig. 4]

[Fig. 5]

conducting carbon → slurry
activated carbon → slurry
TEApTS → slurry
binder/solvent → slurry ball mill mixing slurry + aluminum foil → electrode I doctor blade coating

[Fig. 6]

| percentage of additive to activated carbon | capacitance (F) | ESR (mΩ) |
| --- | --- | --- |
| 5% | 9.15 | 23 |
| 20% | 9.35 | 25 |
| 40% | 9.32 | 26 |
| 60% | 9.33 | 26 |
| 0 | 8.26 | 15 |

[Fig. 7]

| | specific capacitance (F/g) | | energy density (Wh/kg) | | power density (kW/kg) | |
| --- | --- | --- | --- | --- | --- | --- |
| additive | 3.10 | 61% | 2.28 | 6.5% | 19.42 | -36% |
| EDLC | 2.92 | | 2.14 | | 30.36 | |

[Fig. 8]
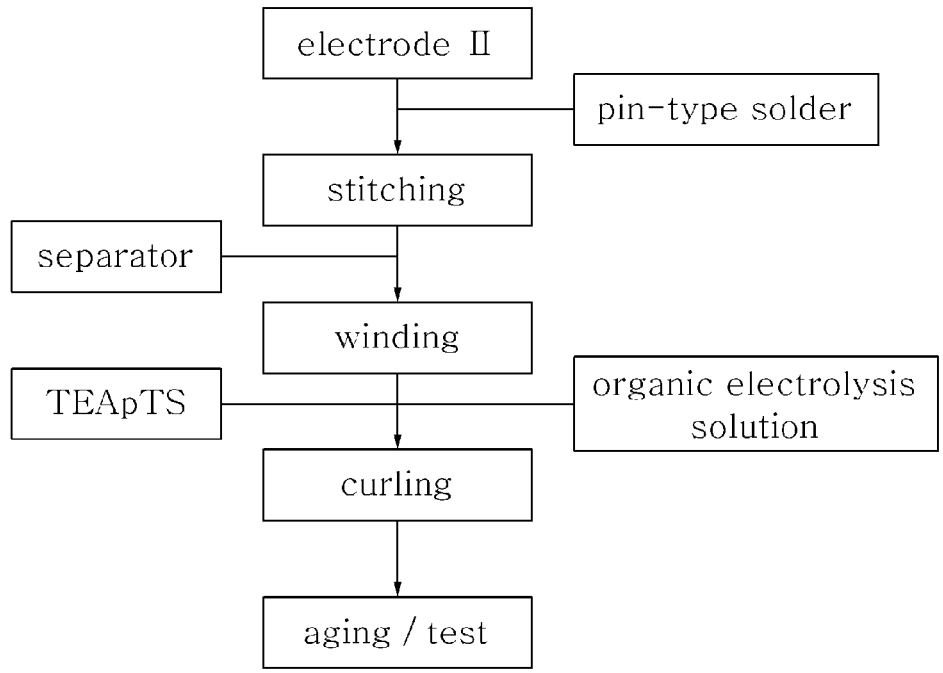
[Fig. 9]
| additive concentration | capacitance (F) | ESR (mΩ) |
|---|---|---|
| 0.5M | 8.92 | 23 |
| 1.0M | 9.21 | 25 |
| 2.0M | 9.25 | 26 |
| 0 | 8.26 | 15 |
[Fig. 10]
| | specific capacitance (F/g) | | energy density (Wh/kg) | | power density (kW/kg) | |
|---|---|---|---|---|---|---|
| additive | 3.07 | 5.1% | 2.25 | 4.9% | 19.42 | -36% |
| EDLC | 2.92 | | 2.14 | | 30.36 | |

CAPACITOR AND MANUFACTURING METHOD THEREOF

CROSS-REFERENCE TO RELATED APPLICATIONS

This application is a National Stage application of International Application No. PCT/KR2006/003540, filed on Sep. 6, 2006, which claims priority of Korean application number 10-2005-0082560, filed on Sep. 6, 2005.

BACKGROUND OF THE INVENTION

1. Field of the Invention

The present invention relates to a capacitor and a method for manufacturing the same. More particularly, the present invention relates to an electric double layer capacitor where the specific capacitance is improved by using an additive in the preparation of electrodes for the capacitor and a method for manufacturing the same.

2. Description of the Prior Art

An electric double layer capacitor (hereinafter referred to as an "EDLC") means a capacitor using an electric double layer that are formed at interfaces between the electrode and electrolyte. As for the structure of an EDLC, it is composed of a pair of polarized electrodes with a separator located therebetween, an electrolyte, a current collector and a case for housing all of them. Activated carbon and carbon alloys (carbon/metal composites) are widely used as materials for EDLC electrodes. Recently, polyacenic semiconductor (PAS), an intermediate between electroconductive polymers and carbon, etc., have been developed and used as a new type of carbon electrode.

Generally, activated carbon, suitable for use as polarized electrodes materials of EDLC, is made from a vegetable material, such as coconut palm shell and cellulose etc., carboniferous or petrolic pitch or cokes, or a thermosetting resin, such as phenol resin, etc. and polyacrylonitrile (PAN), etc. Various attempts have recently been made to modify activated carbon with the aim of improving the specific capacitance of EDLC, which is used as material for polarized electrodes of EDLC.

For example, Japanese Pat. Laid-Open Publication No. 7-220985 discloses the formation of meso pores and improvement of diameter of meso pores. Japanese Pat. Laid-Open Publication Nos. 7-249551 and 9-213589 describe EDLC's the capacitance of which is increased through the modification of materials for activated carbon.

Particularly, Japanese Pat. Laid-Open Publication No. 7-220985 teaches that activated carbon is effective as electrode materials for increasing the capacitance of EDLC in aqueous electrolytes when it has micro slit or oval pores a width and length 1.5 to 3.0 times larger than the diameter of water molecules, and is effective as electrode materials for increasing the capacitance of EDLC in organic electrolytes when the micro pores are 0.2 nm larger than the diameter of the dissolved ions in the electrolyte.

Further, in Japanese Pat. Laid-Open Publication No. 7-249551, polyvinylidenechloride (hereinafter referred to as "PVDC") is thermally treated at 800~1,000° C. in a non-oxidative atmosphere to afford a carbon material, having meso pores, suitable for use as EDLC electrodes.

Meanwhile, in order to provide an electrode with a high-specific capacity, Japanese Pat. Laid-Open Publication No. 9-213589 employs an activated carbon material containing a polymer of vinylidene chloride or a copolymer of vinylidene chloride with other monomers in an amount from 10 to 100 wt %, and preferably in an amount from 80 to 97 wt % as PVDC resin.

Most such conventional methods for improving EDLC in electrostatic capacitance are based on the addition of additives to activated carbon.

SUMMARY OF THE INVENTION

Disclosure

Technical Problem

In the present invention, there is provided an EDLC, activated carbon electrode property of which is improved, to increase specific capacitance so as to solve the problems described above.

Further, there is provided method for producing an EDLC, activated carbon electrode property of which is improved, to increase specific capacitance.

Technical Solution

In accordance with an aspect of the present invention, a capacitor is provided, comprising an electrode made from a conductive material and activated carbon and quaternary ammonium tosylate.

In the capacitor, the quaternary ammonium tosylate is at least one selected from a group consisting of tetraethyl ammonium p-toluene sulfonate (hereinafter referred to as an "TEApTS") and derivatives thereof.

Preferably, the activated carbon is immersed with quaternary ammonium tosylate through immersion in a 0.5~3 M quaternary ammonium tosylate solution.

In a preferable modification, the electrode is prepared by coating a current collector with a slurry of the electroconductive material and the activated carbon and the current collector immersed in a 0.5~3 M quaternary ammonium tosylate solution.

Further, in the capacitor, the electrode is prepared by mixing and dispersing the electroconductive material, the activated carbon, and the quaternary ammonium tosylate in a solvent to form a slurry, and coating a current collector with the slurry.

According to another modification, the electrode including electroconductive material and the activated carbon is immersed in an electrolyte containing the quaternary ammonium tosylate.

In accordance with another aspect of the present invention, a method for producing a capacitor is provided, comprising: dissolving quaternary ammonium tosylate in a solvent to prepare an immersing solution; immersing the activated carbon one to ten times in the immersing solution; and preparing an electrode from the activated carbon immersed with the quaternary ammonium tosylate.

In the method, the solvent may be acetonitrile (hereinafter referred to as an "ACN") or propylene carbonate. The immersing solution contains quaternary ammonium tosylate in a concentration from 0.5 to 3 M.

In accordance with a further aspect of the present invention, a method for producing a capacitor is provided, comprising: preparing activated carbon; preparing quaternary ammonium tosylate in an amount from 5 to 60 weight parts based on 100 weight parts of the activated carbon; and mixing the activated carbon and the quaternary ammonium tosylate to prepare slurry for electrode.

In accordance with still a further aspect of the present invention, a method for producing a capacitor is provided, comprising: dissolving quaternary ammonium tosylate in a solvent to prepare an additive solution; and mixing the additive solution with an electrolyte.

The quaternary ammonium tosylate is at least one selected from group consisting of TEApTs and derivatives thereof.

In the method, the solvent is acetonitrile or propylene carbonate. The immersing solution contains quaternary ammonium tosylate in a concentration from 0.5 to 3 M. Preferably, the immersing solution is mixed with the electrolyte in a volume ratio of 1:1.

Advantageous Effects

Because quaternary ammonium tosylate is used as an additive for activated carbon, which is used as polarized electrode materials, the electrostatic capacitance and energy density of the EDLC can be readily increased. In addition, the method of the present invention allows a high electrostatic capacitance electrode to be readily produced without using special facilities.

Having superior high specific capacitance and high energy density, the electrode prepared according to the present invention is highly useful in EDLC or fuel cells.

BRIEF DESCRIPTION OF THE DRAWINGS

FIG. 1 is a flow chart schematically illustrating processes of producing an electrode through immersion in accordance with a first embodiment of the present invention;

FIG. 2 is a flow chart schematically illustrating processes of producing a capacitor using the electrode prepared through immersion in accordance with the first embodiment of the present invention;

FIG. 3 is a graph in which the capacitance and equivalent series resistance (hereinafter referred to as an "ESR") of the electrode prepared through the immersion method of the present invention are plotted against the number of immersions;

FIG. 4 is a graph in which the capacitance and ESR of the electrode prepared through the immersion method of the present invention are plotted against the concentration of the immersing solution;

FIG. 5 is a flow chart schematically illustrating processes of preparing an electrode through addition method in accordance with a second embodiment of the present invention of the present invention;

FIG. 6 is a table in which the capacitance and ESR of the electrode prepared through the addition method according to the second embodiment change with the proportion of the additive;

FIG. 7 is a table in which the specific electrostatic capacitance and energy density are compared between the electrode prepared through the addition method according to the second embodiment of the present invention and a conventional EDLC electrode;

FIG. 8 is a flow chart schematically illustrating processes for producing a capacitor through immersion method in an electrolyte in accordance with a third embodiment of the present invention;

FIG. 9 is a table in which the capacitance and ESR of the capacitor prepared through immersion method in an electrolyte according to the third embodiment change with the proportion of the additive;

FIG. 10 is a table in which specific capacitance and energy density are compared between the electrode prepared through the immersion method according to the third embodiment of the present invention and a conventional EDLC electrode.

DETAILED DESCRIPTION OF THE PRESENT INVENTION

An EDLC comprises a couple of polarized electrodes spaced apart from each other with a separator located therebetween, an electrolyte in which the electrodes are immersed, and a current collector. Because the polarized electrodes are made mostly from activated carbon, the specific capacitance of EDLC depends largely on the surface area and pore distributions of the activated carbon.

Intensive and thorough research into EDLC, conducted by the present inventors, resulted in the finding that the addition of quaternary ammonium tosylate to an activated carbon electrode or an electrolyte results in a great improvement in the specific capacitance of EDLC, leading to the present invention.

As long as it has a large surface area, a low internal resistance and a high density, any activated carbon may be used without particular limitation. In detail, activated carbon suitable for use in the present invention has preferably a surface area of 1,000 $m^2/g$ or greater, a resistance of 20 m ohm or less, and a density of 0.6 $g/cm^3$ or greater.

Examples of preferable quaternary ammonium tosylate (toluene sulfonate) include TEApTS and derivatives thereof.

In the present invention, a method of associating activated carbon with quaternary ammonium tosylate, useful for the production of a capacitor, may be preferably exemplified by, but is not limited to, the immersion of activated carbon in a quaternary ammonium tosylate solution, the addition of quaternary ammonium tosylate during the preparation of activated carbon, or the addition of quaternary ammonium tosylate to an electrolysis solution. Here, quaternary ammonium tosylate solution is made by adding quaternary ammonium tosylate solution to suitable solvent. The suitable solvents may be acetonitrile or propylene carbonate etc.

Below, a description is given of a method for producing a capacitor according to an embodiment of the present invention, with reference to FIGS. 1 and 2.

First, as shown in FIGS. 1 and 2, conducting carbon and activated carbon are mixed together with a binder in a solvent, followed by homogeneously mixing and dispersing by means of a ball mill mixer to form a slurry.

Subsequently, the slurry is coated on aluminum foil to form a primary electrode (electrode I). The coating of the aluminum foil with the slurry may be conducted without particular limitation, and preferably with a doctor blade method.

By immersing the primary electrode in a 0.5~3 M solution of quaternary ammonium tosylate, a secondary electrode (electrode II) results. The number of immersions may be controlled depending on the purpose. A preferable solvent is acetonitrile.

The secondary electrode is stitched with pin type electric terminals and wound with a polymer separator to form a cell.

After being dried in an oven, the cell is immersed in an electrolyte, cased and sealed to prepare a capacitor.

With reference to FIG. 5, a production method in accordance with another embodiment of the present invention is illustrated.

As shown in FIG. 5, the method is conducted in the same manner as in FIGS. 1 and 2, with the exception that conducting carbon, activated carbon and a binder are mixed together with quaternary ammonium tosylate in a solvent, homogeneously mixed, and dispersed by means of a ball mill mixer to form a slurry.

Other embodiment of the method for producing a capacitor is illustrated in FIG. 8.

As shown in FIG. 8, the production of a capacitor is the same as illustrated in FIGS. 1 and 2, with the exception that quaternary ammonium tosylate is added to the electrolysis solution.

Mode for Invention

A better understanding of the present invention may be obtained through the following examples, which are set forth to illustrate, but are not to be construed as the limit of the present invention.

EXAMPLE 1

100 ml of a 0.5 M acetonitrile (ACN) solution containing 15.73 g of TEApTS was prepared as an immersing solution. In this immersing solution, 10 g of RP20 activated carbon, manufactured by Kuraray, Japan, was immersed once to obtain quaternary ammonium tosylate-immersed activated carbon.

The quaternary ammonium tosylated-immersed activated carbon was dried at room temperature.

75 weight parts of the dried quaternary ammonium tosylated-immersed activated carbon, 15 weight parts of an conducting carbon, and 10 weight parts of a binder were mixed and dispersed in water to obtain slurry.

The slurry thus obtained was coated on aluminum foil and dried at 80° C. for about 10 minutes in a drying oven to prepare an electrode.

The electrode was cut to dimensions of 20 cm×3 cm and formed at a position 3 cm distant from one end thereof with a pin-type electric terminal for an negative electrode, and to dimensions of 22 cm×3 cm and formed at a position 4 cm distant from one end thereof with a pin-type electric terminal for a positive electrode.

Thereafter, a paper separator was cut into dimensions of 60 cm×4 cm by means of a cylindrical winder and then folded in half to be 30 cm in length. The cathode electrode was positioned between the folded (folded-in-half) separator while the anode electrode was positioned on the separator before the separator was wound spirally.

In order to prevent it from coming loose, the wound cell thus obtained was wound with polyethylene tape.

After being dried at 120° C. for 48 hours in a vacuum oven, the wound cell was immersed in an electrolysis solution in a glove box at room temperature for 10 minutes. Afterwards, the cell was housed within an aluminum case into which a rubber plug was inserted, and which was sealed with epoxy sealant, so as to produce a capacitor.

EXAMPLE 2

The same procedure as in Example 1 was conducted to produce a capacitor, with the exception that the immersing solution had a concentration of 1.0 M.

EXAMPLE 3

The same procedure as in Example 1 was conducted to produce a capacitor, with the exception that the immersing solution had a concentration of 1.5 M.

EXAMPLE 4

The same procedure as in Example 1 was conducted to produce a capacitor, with the exception that the immersing solution had a concentration of 2.0 M.

EXAMPLE 5

The same procedure as in Example 1 was conducted to produce a capacitor, with the exception that the immersing solution had a concentration of 2.5 M.

EXAMPLE 6

The same procedure as in Example 1 was conducted to produce a capacitor, with the exception that the immersing solution had a concentration of 3.0 M.

EXAMPLES 7 TO 15

Capacitors were produced in the same manner as in Example 1, except that the activated carbon was immersed two to ten times, respectively.

EXAMPLE 16

An electrode was prepared from a mixture of 100 weight parts of RP20 activated carbon, manufactured by Kuraray, Japan, and 5 weight parts of TEApTS in a dry mixing process.

The electrode was cut to dimensions of 20 cm×3 cm and formed at a position 3 cm distant from one end thereof with a pin-type electric terminal for a negative electrode, and to dimensions of 22 cm×3 cm and formed at a position 4 cm distant from one end thereof with a pin-type electric terminal for a positive electrode.

Thereafter, a paper separator was cut into dimensions of 60 cm×4 cm by means of a cylindrical winder and then folded in half to be 30 cm in length. The positive electrode was positioned between the folded (folded-in-half) separator while the negative electrode was positioned on the separator before the separator was wound spirally. In order to prevent it from coming loose, the wound cell thus obtained was wound with polyethylene tape.

After being dried at 120° C. for 48 hours in a vacuum oven, the wound cell was immersed in an electrolysis solution in a glove box at room temperature for 10 minutes. Afterwards, the cell was housed in an aluminum case into which a rubber plug was inserted, and which was sealed with epoxy sealant, so as to produce a capacitor.

EXAMPLE 17

The same procedure as in Example 16 was conducted to produce a capacitor, with the exception that 20 weight parts of TEApTS was added to 100 weight parts of RP20 activated carbon, manufactured by Kuraray, Japan.

EXAMPLE 18

The same procedure as in Example 16 was conducted to produce a capacitor, with the exception that 40 weight parts of TEApTS was added to 100 weight parts of RP20 activated carbon, manufactured by Kuraray, Japan.

EXAMPLE 19

The same procedure as in Example 16 was conducted to produce a capacitor, with the exception that 60 weight parts of TEApTS was added to 100 weight parts of RP20 activated carbon, manufactured by Kuraray, Japan.

EXAMPLE 20

15.73 g of TEApTS was added to ACN to form 100 ml of a 0.5 M acetonitril solution as an additive solution. This additive solution was mixed with 100 ml of 1.0M Et$_4$NBF$_4$/ACN to give an electrolysis solution.

75 weight parts of RP20 activated carbon, manufactured by Kuraray, Japan, 15 weight parts of a conducting carbon, and 10 weight parts of a binder were mixed and dispersed in water to obtain slurry.

The slurry thus obtained was layered on aluminum foil and dried at 80° C. for about 10 minutes in a drying oven to prepare an electrode.

The electrode was cut to dimensions of 20 cm×3 cm and formed at a position 3 cm distant from one end thereof with a pin-type electric terminal for a negative electrode, and to dimensions of 22 cm×3 cm and formed at a position 4 cm distant from one end thereof with a pin-type electric terminal for a positive electrode.

Thereafter, a paper separator was cut into dimensions of 60 cm×4 cm by means of a cylindrical winder and then folded in half to be 30 cm in length. The positive electrode was positioned between the folded (folded-in-half) separator while the electrode was positioned on the separator before the separator was wound spirally.

In order to prevent it from coming loose, the wound cell thus obtained was wound with polyethylene tape.

After being dried at 120° C. for 48 hours in a vacuum oven, the wound cell was immersed in an electrolysis solution stored in a glove box for 10 minutes. Afterwards, the cell was housed in an aluminum case in which a rubber plug was inserted, and which was sealed with epoxy sealant, so as to produce a capacitor.

EXAMPLE 21

The same procedure as in Example 20 was conducted to produce a capacitor, with the exception that the additive solution had a concentration of 1.0 M.

EXAMPLE 22

The same procedure as in Example 20 was conducted to produce a capacitor, with the exception that the additive solution had a concentration of 2.0 M.

The specific capacitance, energy density, and ESRs of the capacitors produced in the above examples were examined.

Capacitances and ESRs of the capacitors produced in Examples 1 and 7 to 15 were measured, and the results are given in FIG. 3 which shows changes in capacitance and ESR with the number of immersions of activated carbon in the immersing solution.

When immersed in the immersing solution of example 1, as shown in FIG. 3, the activated carbon was greatly improved with respect to capacitance and ESR.

Capacitances and ESRs of the capacitors produced in Examples 1 to 6 were measured and the results are given in FIG. 4, which shows capacitance and ESR depending on the concentration of the immersing solution.

As shown in FIG. 4, a higher concentration of the immersing solution generally brings about a greater improvement in capacitance and ESR.

The capacitance and ESR of the capacitors produced in Examples 16 to 19 were measured and the results are given in FIG. 6, which shows changes in capacitance and ESR with the weight percentage of the additive to activated carbon.

According to the use of the additive, the difference in specific capacitance, energy density and power density among the electrodes of the capacitors produced in Examples 16 to 19 is given in FIG. 7.

When the additive was used, as shown in FIG. 7, a 6.1% improvement in specific capacitance and a 6.5% improvement in energy density were achieved, while power density was decreased by 36%.

Capacitance and ESRs of the capacitors produced in Examples 20 to 22 were measured and the results are given in FIG. 9, which illustrates changes in capacitance and ESR with the concentration of the additive solution to electrolyte.

As is apparent from the data of FIG. 9, a higher concentration of the additive solution brings about greater improvement in capacitance and ESR of capacitor.

According to the use of the additive, the difference in specific capacitance, energy density and power density among the electrodes of the capacitors produced in Examples 20 to 22 is given in FIG. 10.

When the additive was used, as shown in FIG. 10, specific capacitance was improved by 5.1% and energy density by 4.9% while power density was decreased by 36%.

Taken together, the data obtained in Examples and analysis tests demonstrate that the electrode prepared from quaternary ammonium tosylate-added activated carbon in accordance with the method of the present invention has capacitance increased by about 10% and specific capacitance and energy density increased by about 6% each, compared to a conventional electrode (corresponding to zero immersion time or zero weight percentage of additive in each figure).

INDUSTRIAL APPLICABILITY

In accordance with the present invention, the use of quaternary ammonium tosylate in the polarized electrode made mainly from activated carbon readily contributes to increasing the capacitance and energy density of an EDLC. In addition, the method of the present invention allows a high capacitance electrode to be produced without using special facilities.

Having high specific capaictance and high energy density, the electrode prepared according to the present invention is highly useful for use in EDLC or fuel cells.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. A method for producing a capacitor, said method comprising the steps of:
   dissolving quaternary ammonium tosylate in a solvent to prepare an immersing solution, wherein the solvent is selected from the group consisting of acetonitrile and propylene carbonate;
   immersing activated carbon one to ten times in the immersing solution to obtain quaternary ammonium tosylated-immersed activated carbon, wherein the immersing solution contains quaternary ammonium tosylate in a concentration from 0.5 to 3.0 M;
   mixing and dispersing the quaternary ammonium tosylated-immersed activated carbon, conducting carbon, and a binder in water to obtain a slurry; and
   making an electrode using the slurry.

2. The method according to claim 1, wherein the quaternary ammonium tosylate is at least one selected from the group consisting of tetraethylammonium p-toluene sulfonate and derivatives of tetraethylammonium p-toluene sulfonate.

3. A method for producing a capacitor, said method comprising the steps of:
dissolving quaternary ammonium tosylate in a solvent to prepare an additive solution;
mixing the additive solution with an electrolysis solution;
mixing and dispersing activated carbon, conducting carbon and a binder in water to obtain a slurry; and
layering and drying the slurry on aluminum foil to make an electrode, and wherein the solvent is selected from the group consisting of acetonitrile and propylene carbonate and wherein the additive solution contains the quaternary ammonium tosylate in a concentration from 0.5 to 3.0 M.

4. The method according to claim 3, wherein said step of mixing the additive solution with an electrolysis solution comprises mixing said additive solution with the electrolysis solution in a volume ratio of 1:1.

5. The method according to claim 3, wherein the quaternary ammonium tosylate is at least one selected from the group consisting of tetraethylammonium p-toluene sulfonate and derivatives of tetraethylammonium p-toluene sulfonate.

* * * * *